United States Patent
Kim et al.

(10) Patent No.: US 8,949,847 B2
(45) Date of Patent: Feb. 3, 2015

(54) APPARATUS AND METHOD FOR MANAGING RESOURCES IN CLUSTER COMPUTING ENVIRONMENT

(75) Inventors: Young-Ho Kim, Daejeon (KR); Gyu-Il Cha, Daejeon (KR); Shin-Young Ahn, Daejeon (KR); Eun-Ji Lim, Daejeon (KR); Jin-Mee Kim, Daejeon (KR); Seung-Jo Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 354 days.

(21) Appl. No.: 13/584,028

(22) Filed: Aug. 13, 2012

(65) Prior Publication Data

US 2013/0198755 A1  Aug. 1, 2013

(30) Foreign Application Priority Data

Jan. 31, 2012 (KR) .................. 10-2012-0009788

(51) Int. Cl.
*G06F 9/46* (2006.01)

(52) U.S. Cl.
USPC .......................... 718/104; 718/105; 709/226

(58) Field of Classification Search
None
See application file for complete search history.

(56) References Cited

U.S. PATENT DOCUMENTS

| | | | | |
|---|---|---|---|---|
| 5,341,477 A | * | 8/1994 | Pitkin et al. ............... | 709/226 |
| 6,952,714 B2 | * | 10/2005 | Peart ............................ | 709/203 |
| 7,707,288 B2 | * | 4/2010 | Dawson et al. ............. | 709/226 |
| 7,761,557 B2 | * | 7/2010 | Fellenstein et al. ........ | 709/224 |
| 7,900,206 B1 | * | 3/2011 | Joshi et al. ................. | 718/104 |
| 8,479,216 B2 | * | 7/2013 | Lakshmanan et al. ...... | 718/105 |
| 8,584,131 B2 | * | 11/2013 | Wong et al. ................. | 718/104 |
| 8,713,182 B2 | * | 4/2014 | Agneeswaran ............. | 709/226 |
| 2005/0160428 A1 | * | 7/2005 | Ayachitula et al. ........ | 718/104 |
| 2007/0233843 A1 | * | 10/2007 | Frey-Ganzel et al. ..... | 709/223 |
| 2008/0229320 A1 | * | 9/2008 | Ueda .......................... | 718/104 |

(Continued)

FOREIGN PATENT DOCUMENTS

KR   10-2008-0131708   7/2010

OTHER PUBLICATIONS

Karthick Kumar; "A Dynamic Load Balancing Algorithm in Computational Grid Using Fair Scheduling", IJCSI, vol. 8, Issue 5, No. 1, Sep. 2011; (Kumar_2011.pdf, pp. 1-7).*

(Continued)

*Primary Examiner* — Gregory A Kessler
*Assistant Examiner* — Hiren Patel
(74) *Attorney, Agent, or Firm* — Staas & Halsey LLP (57) ABSTRACT

Disclosed herein are a resource manager node and a resource management method. The resource manager node includes a resource management unit, a resource policy management unit, a shared resource capability management unit, a shared resource status monitoring unit, and a shared resource allocation unit. The resource management unit performs an operation necessary for resource allocation when a resource allocation request is received. The resource policy management unit determines a resource allocation policy based on the characteristic of the task, and generates resource allocation information. The shared resource capability management unit manages the topology of nodes, information about the capabilities of resources, and resource association information. The shared resource status monitoring unit monitors and manages information about the status of each node and the use of allocated resources. The shared resource allocation unit sends a resource allocation request to at least one of the plurality of nodes.

10 Claims, 5 Drawing Sheets

(56) References Cited

U.S. PATENT DOCUMENTS

2010/0306780 A1* 12/2010 Mikamo ............ 718/104
2013/0272253 A1* 10/2013 Veenstra et al. ............ 370/329

OTHER PUBLICATIONS

Buyya et al.; "Nimrod/G: An architecture for a resource management and scheduling system in a global computational grid", Proceedings of the HPC ASIA'2000, IEEE Computer Society Press, USA, 2000. (Buyya.pdf, pp. 1-7).*

Kim et al.; "Policy-based resource allocation in hierarchical virtual organizations for global grids" 2006 IEEE; Proceedings of the 18$^{th}$ International symposium on computer architecture and HPC; (Kim_2006.pdf, pp. 1-8).*

Rajesh Raman, et al., "Policy Driven Heterogeneous Resource Co-Allocation with Gangmatching", Proceedings of the 12$^{th}$ IEEE International Symposium on High Performance Distributed Computing, pp. 1-10, 2003.

* cited by examiner

APPARATUS AND METHOD FOR MANAGING RESOURCES IN CLUSTER COMPUTING ENVIRONMENT

CROSS-REFERENCE TO RELATED APPLICATION

This application claims the benefit of Korean Patent Application No. 10-2012-0009788, filed on Jan. 31, 2012, which is hereby incorporated by reference in its entirety into this application.

BACKGROUND OF THE INVENTION

1. Technical Field

The present invention relates generally to an apparatus and method for managing resources in a cluster computing environment and, more particularly, to an efficient resource management method and apparatus based on policies, which are capable of distributing and managing resources while taking into consideration the resource characteristics of the resources in a cluster computing environment including high-performance heterogeneous resources. That is, the present invention relates to improving the efficiency of resource management by allocating optimal and heterogeneous resources in accordance with the various characteristics of application software in an environment in which nodes constituting a cluster system include heterogeneous resources.

2. Description of the Related Art

A distributed/parallel computing environment which is the mainstream in the field of High Performance Computing (UPC) is a cluster system. Furthermore, with the development of hardware technology, the resources of nodes constituting a cluster system are being diversified and are becoming heterogeneous, and the capacity supported by each resource is increasing.

Figure 1:
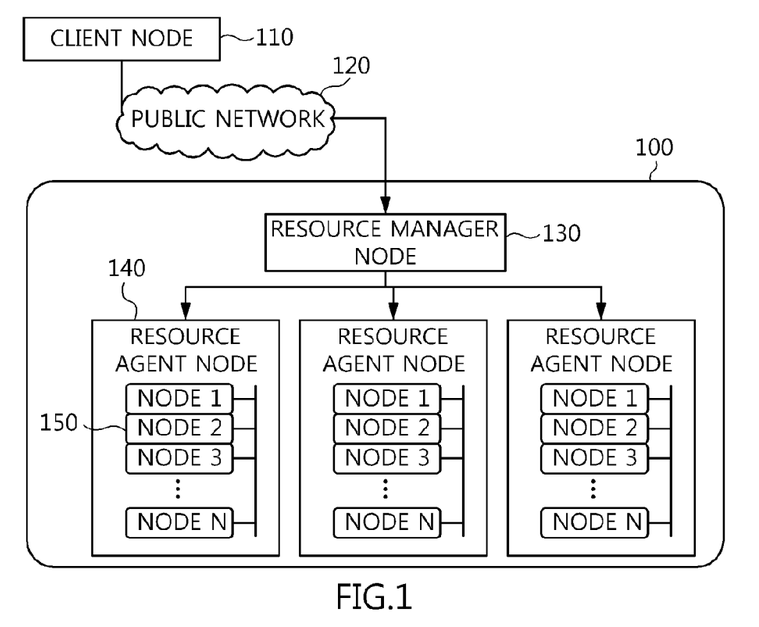
FIG. 1 is a diagram showing the configuration of a cluster resource management system.
Figure 2:
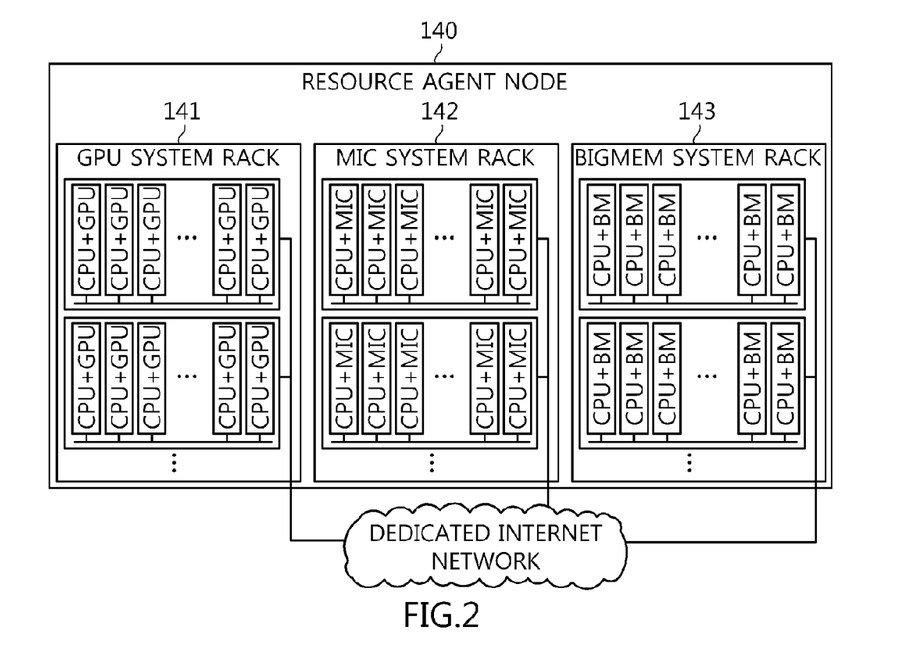
FIG. 2 is a detailed diagram showing the resource agent node of FIG. 1.

FIG. 1 is a diagram showing the configuration of a cluster resource management system, and FIG. 2 is a detailed diagram showing the resource agent node of FIG. 1.

The cluster resource management system may be formed of a heterogeneous many-core-based HPC cluster resource management system.

Most of HPC cluster systems provide a dedicated resource management system. Referring to FIG. 1, from the viewpoint of a resource management system, the hardware of a cluster system 100 may include resource agent nodes 140 each including computation performance acceleration nodes 150 based on heterogeneous computing devices, and a resource manager node 130 providing the effective system management and service of heterogeneous resources. The resource agent nodes 140 and the resource manager node 130 may be connected over a high-speed network-based system network Accordingly, a client node 110 connected to the heterogeneous HPC cluster system over a public network 120 may access the heterogeneous HPC cluster system, request the allocation of resources to perform a task, and then execute application software on allocated nodes including the requested resources when the nodes are allocated.

As shown in FIG. 2, resource agent nodes 141, 142 and 143 which constitute part of a cluster may have different hardware resource forms depending on their roles.

That is, a heterogeneous many-core cluster does not include a form in which nodes have the same resource configuration and computing capability, but has a form in which nodes have configurations and computing capabilities specific to their resource configurations.

Accordingly, the improvement of overall operation performance can be achieved only when applications capable of efficiently using resources based on the characteristics of each node are executed. That is, as shown in FIG. 2, the resource agent node 140 may include nodes 141 including performance computation acceleration apparatuses such as a Graphics Processing Unit (GPU), nodes 142 including a different type of performance computation acceleration apparatuses such as a Many Integrated Core (MIC), and nodes 143 on each of which high capacity memory supporting high capacity memory BIGMEM is mounted.

Therefore, the resource agent node 140 may include a node configuration which guarantees better performance when performing an application program chiefly using a Central Processing Unit (CPU), a node configuration which requires high performance input and output or high capacity memory, and a node configuration which guarantees better performance when performing an application program chiefly using data, depending on the types of resources which constitutes each node.

A conventional resource management system for an HPC cluster environment is problematic in that it does not sufficiently take into consideration efficient resource management for a heterogeneous many-core-based HPC system which utilizes various performance acceleration apparatuses, such as a GPGPU, an MIC, and an FPGA, together with a general-purpose processor (CPU).

Meanwhile, with the development and improvement of hardware technology, the targets of management in each constituent node have become gradually heterogeneous and have had high capability. That is, each constituent node may have heterogeneous performance acceleration apparatuses such as a general-purpose processor, a GPGPU, and an FPGA having hundreds of cores and high-capacity node memory having a capacity equal to or higher than hundreds of Giga bytes.

Furthermore, each socket, that is, a set of cores, has memory, the sum of the capacities of such pieces of memory is the capacity of node memory, and the access cost to another core are relatively high because the memory belongs to the same system but has a different distance. Accordingly, to achieve efficient execution and improved performance, it is effective to allocate memory connected to a relevant core. If the positions of associated resources or the distances to the associated resources, such as a processor and memory, are not taken into consideration when an application is performed, performance is deteriorated. That is, if resources are not efficiently allocated and managed in accordance with the characteristics of an application being performed, overall resource utilization is significantly deteriorated and the performance of execution of the application is not sufficiently guaranteed.

Furthermore, the performance of a parallel program which is performed in a cluster environment, such as a Message Passing Interface (MPI), is dependent upon a network data transfer rate. Accordingly, adjacent nodes which may minimize the communication costs between allocated nodes on the same application. In order to achieve such allocation, it is necessary to check the network topology of all nodes constituting a cluster and the communication costs between nodes and allocate the nodes after taking into consideration the network topology and the communication costs. In the conventional resource management system, however, a node topology and communication costs are not taken into consideration when parallel program resources are allocated.

Accordingly, in accordance with the conventional technology, there is a significant difference in resource utilization depending on the application, resulting in low computation performance efficiency. Furthermore, there is a problem in that the efficiency of operation of resources in multi-task scheduling is low because resource allocation in an environment in which heterogeneous computing resources having heterogeneous characteristics are mixed is not sufficiently taken into consideration.

Furthermore, in order to solve the above problems, an invention relating to the monitoring of the status of resource utilization (Korean Patent Application Publication No. 10-2010-0073120) was disclosed, but the invention has a limitation on application to a cluster system in which various types of resources are mixed.

SUMMARY OF THE INVENTION

Accordingly, the present invention has been made keeping in mind the above problems occurring in the prior art, and an object of the present invention is to provide a resource manager node and a resource management method for a cluster system, in which the resource management and monitoring of a heterogeneous cluster system are effectively unified via a service node.

That is, an object of the present invention is to provide a resource manager node and a resource management method, which allocate optimal heterogeneous resources in accordance with the various characteristics of application software, providing node connection topology and distance-based node and resource allocation in order to optimize the performance of the execution of parallel programs operating on multiple nodes, and extracting, standardizing, and allocating resource capacity in a system resource performance form required in an HPC application, thereby improving resource utilization in the execution of application software and maximizing the efficiency of computation performance.

In order to accomplish the above object, the present invention provides a resource manager node, including a resource management unit for performing an operation necessary for resource allocation when a resource allocation request for performance of a specific task on a cluster system including heterogeneous resources is received; a resource policy management unit for managing a resource characteristic-based resource allocation policy and a quantitative resource allocation policy, determining a resource allocation policy based on a characteristic of the task, and generating resource allocation information including information about one or more allocated node and resources based on the determined resource allocation policy; a shared resource capability management unit for managing a topology of a plurality of nodes connected to the resource manager node, information about capabilities of resources of each of the nodes, and resource association information of each of the nodes; a shared resource status monitoring unit for monitoring and managing information about status of each of the plurality of nodes and information about use of allocated resources; and a shared resource allocation unit for sending a resource allocation request according to the resource allocation information to at least one of the plurality of nodes based on the resource allocation information, the topology information, and the resource capability information.

Furthermore, in order to accomplish the above object, the present invention provides a resource allocation method for a resource manager node of a cluster system including heterogeneous resources, including, when a request for resource allocation to perform a specific task is received, determining a resource allocation policy based on a characteristic of the specific task; determining at least one node whose resources will be allocated based on the determined resource allocation policy, a topology of nodes included in the cluster system, and information about capabilities of resources constituting each of the nodes; if the determined node is a multi-node and the resource manager node corresponds to a communication-based parallel model, generating a first node list including nodes having lowest communication cost based on the topology of the nodes; generating a second node list including nodes belonging to the nodes included in the first node list and meeting a resource association condition based on resource association information of each of the nodes; generating resource allocation information by referring to information about status of each of the nodes and use of allocated resources so that resources are provided by a node having lowest node load in the second node list; and requesting resource allocation by sending the generated resource allocation information to the determined node.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, throughout which the same reference numerals are used to designate the same or similar components.

A resource manager node and a resource management method according to embodiments of the present invention are capable of efficiently allocating and managing heterogeneous resources based on policies, in which resource characteristics have been taken into consideration, in an HPC heterogeneous cluster system.

Furthermore, nodes for performing resource management may be classified into two types. That is, in accordance with the embodiments, the nodes may be classified into a resource manager node for actually processing resource allocation in response to requests from a user and a task scheduler, and resource agent nodes for actually performing resource allocation in response to a request from the resource manager node and monitoring status information, such as the use of resources.

Accordingly, the resource manager node corresponding to a master node for performing resource management may provide resource management services, such as resource allocation and monitoring, while operating in conjunction with the resource agent nodes operating in a plurality of nodes constituting a cluster in a centralized management form.

Furthermore, each of the resource agent nodes may include nodes which constitute a cluster, and may include computation nodes which include heterogeneous many-cores in which application tasks are actually performed.

Figure 3:
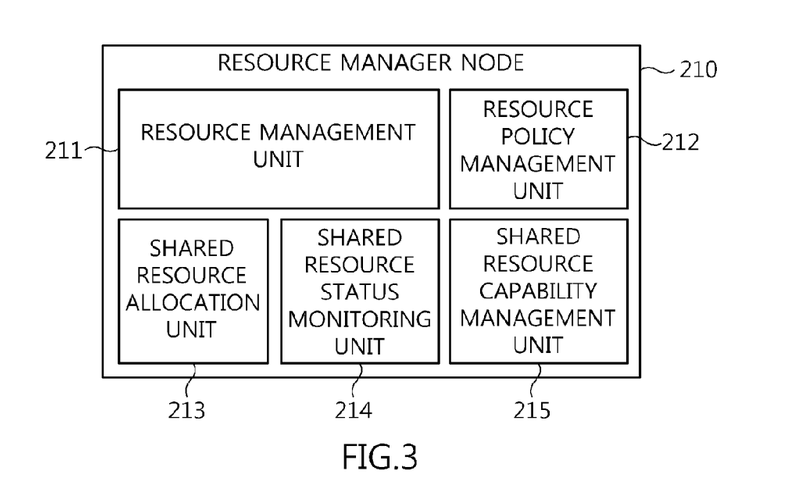
FIG. 3 is a diagram showing the configuration of a resource manager node according to an embodiment of the present invention.

FIG. 3 is a diagram showing the configuration of a resource manager node according to an embodiment of the present invention.

Figure 4:
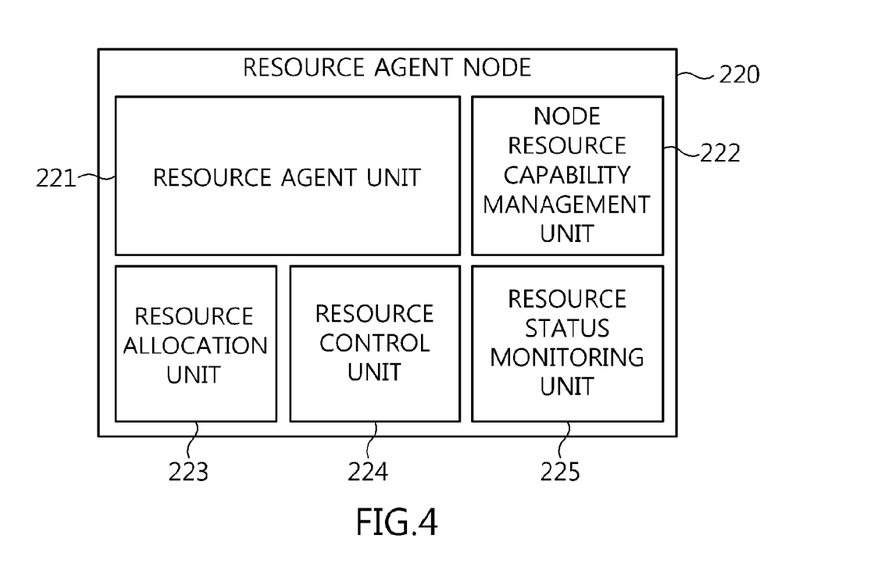
FIG. 4 is a diagram showing the configuration of a resource agent node according to an embodiment of the present invention.

In accordance with the embodiments, a resource management system may include a resource manager node 210, and a resource agent node 220 shown in FIG. 4. Furthermore, the resource coordinator of the resource management system is installed in the resource manager node 210 for providing resource management services, and provides resource management services while operating in conjunction with a plurality of nodes which constitutes a cluster system. Furthermore, the resource agent node 220 may be installed in each of the resource agent nodes, that is, the targets of resource management, which constitute a cluster system.

Furthermore, the resource manager node 210 may include five modules, that is, a resource management unit 211, a resource policy management unit 212, a shared resource allocation unit 213, a shared resource status monitoring unit 214, and a shared resource capability management 215.

In accordance with the embodiment, the resource management unit 211, when a resource allocation request for the performance of a specific task is input to a cluster system including heterogeneous resources, performs an operation necessary to allocate resources by controlling the modules of the resource manager node 210. That is, the resource management unit 211 may analyze received parameters, transfer information necessary to execute a lower block, and control a task so that an operation is appropriately performed.

The resource management unit 211 may transfer a task, such as the preparation or changing of resource allocation policies, a request for resource allocation, or the monitoring of the status of nodes or resources or the use of resources, to a relevant block The resource policy management unit 212 may manage a resource allocation policy and a quantitative resource allocation policy based on the characteristics of resources, and determine a resource allocation policy based on the characteristic of a task which is performed in a cluster system. That is, the resource policy management unit 212 may determine allocated nodes and resources by applying a policy in which a characteristic has been taken into consideration to the management of resource allocation policies and the selection of allocated resources.

The shared resource capability management unit 215 may manage the topology of nodes connected to the resource manager node 210, information about the capabilities of resources constituting each node, and information about resources associated with each node. That is, the shared resource capability management unit 215 may manage the topology of nodes constituting a cluster, information about the capabilities of resources constituting each node, and information about resources associated with each node.

The shared resource allocation unit 213 may send a resource allocation request according to resource allocation information to the resource provision unit of a specific node based on resource allocation information of the resource policy management unit 212 and the resource capability information of the shared resource capability management 215. That is, the shared resource allocation unit 213 may allocate optimal nodes and resources based on the resource allocation policy, the topology, and the resource capability information.

The shared resource status monitoring unit 214 may manage the topology of nodes connected to the resource manager node 210, the information about the capabilities of resources constituting each node, and the information about resources associated with each node. That is, the shared resource status monitoring unit 214 may monitor and manage the status of all nodes constituting a cluster system and information about the use of allocated resources.

The resource policy management unit 212 may manage a resource characteristic-based resource allocation policy and a quantitative resource allocation policy, determine a resource allocation policy based on the characteristic of a task, and generate resource allocation information including information about allocated nodes and resources in conformity with the determined resource allocation policy. That is, the resource policy management unit 212 may perform a task for determining allocated nodes and resources by applying a policy in which a characteristic has been taken into consideration to the management of resource allocation policies and the selection of allocated resources.

In accordance with the embodiment, the resource allocation policies may support a quantitative resource allocation policy (i.e., the number of nodes, the number of cores, the capacity of memory, and I/O bandwidth) provided by a conventional resource management system and a resource characteristic-based resource allocation policy additionally provided by the present invention. The policies and the resource characteristic-based resource allocation policy will be described in detail later with reference to FIG. 4.

Furthermore, the resource policy management unit 212 may set any one of a characteristic requiring data-intensive, a characteristic requiring compute-intensive, and a characteristic requiring complex performance for a task to be performed in a cluster system.

Furthermore, in accordance with the embodiment, if a determined node is a multi-node and the resource manager node 210 corresponds to a communication-based parallel model, the resource policy management unit 212 may generate a first node list including nodes having the lowest communication cost based on the topology information provided by the shared resource capability management unit 215, generate a second node list including nodes belonging to the nodes included in the first node list and meeting a resource association condition by referring to resource association information provided by the shared resource capability management unit 215, and generate resource allocation information so that resources can be provided by one or more nodes having the lowest node load within the second node list by referring to the monitoring information. If the determined node is a multi-node and the resource manager node 210 does not correspond to a communication-based parallel model, the resource policy management unit 212 may generate a third node list including nodes meeting a resource association condition after taking into consideration resource association information provided by the shared resource capability management unit 215, and generate resource allocation information so that resources can be provided by one or more nodes having the lowest node load within the third node list by referring to the monitoring information.

Furthermore, in accordance with another embodiment, if the determined node is a single node and the determined resource allocation policy is not a quantitative resource allocation policy, the resource policy management unit 212 may determine the characteristic of the task, generate a fourth node list including nodes having resources matching the determined characteristic based on resource capability information provided by the shared resource capability management unit 215, and generate resource allocation information so that resources can be provided by a node having the lowest node load within the fourth node list by referring to the monitoring information. If the determined node is a single node and the determined resource allocation policy is a quantitative resource allocation policy, the resource policy management unit 212 may generate a fifth node list including nodes belonging to all nodes connected to the resource manager node 210 through the shared resource capability management unit 215 and being able to allocate resources in response to a resource allocation request, generate a sixth node list including nodes belonging to the nodes included in the fifth node list and meeting a resource association condition by referring to the resource association information of the shared resource capability management unit 215, and generate resource allocation information so that resources can be provided by a node having the lowest node load within the sixth node list by referring to the monitoring information.

In accordance with the embodiment, the shared resource allocation unit 213 may send a resource allocation request according to the resource allocation information to the resource provision unit of a specific node based on the resource allocation information of the resource policy management unit 212 and the topology and resource capability information of the shared resource capability management unit 215. That is, one or more optimal nodes and resources may be allocated based on the resource allocation policy, the topology, and the resource capability information.

Furthermore, the shared resource allocation unit 213 requests the allocation of resources by sending information about the selected nodes and resources to the resource provision unit of a target node. After the resource allocation request has been accomplished, the shared resource allocation unit 213 may generate a resource allocation instance, and store the resource allocation instance after incorporating information about the allocated nodes and the resources into the resource allocation instance.

The shared resource capability management 215 may manage the topology of nodes connected to the resource manager node 210, information about the capabilities of resources constituting each node, and information about resources associated with each node. That is, the shared resource capability management 215 may manage the topology of nodes constituting a cluster system, the information about the capabilities of resources constituting each node, and the information about resources associated with each node.

Furthermore, the shared resource capability management 215 may extract, store, and manage information about a cluster node topology and network distances, store and manage information about resources associated with each node, and store and manage resource capability information for each resource configuration, such as floating-point operations per second (FLOPS), input/output operations per second (IOPS), and bandwidth information for each node. Furthermore, the shared resource capability management 215 may receive, store, and manage resource capability information for each node when it is connected to the resource provision unit of the node.

The shared resource status monitoring unit 214 may monitor and manage information about the status of all constituent nodes and the use of allocated resources. Accordingly, when resources are allocated, the information about the status and the use of resources may be used in order to distribute load and improve the efficiency of use.

FIG. 4 is a diagram showing the configuration of the resource agent node 220 according to an embodiment of the present invention.

In accordance with the embodiment, the resource agent node 220 may include five modules, that is, a resource agent unit 221, a node resource capability management unit 222, a resource allocation unit 223, a resource control unit 224, and a resource status monitoring unit 225.

That is, in accordance with the embodiment, the resource agent node 220 may include the resource agent unit 221 for analyzing parameters for a request received from the resource manager node 210 of FIG. 2, transferring information necessary to execute a lower block, and controlling a task so that a requested operation is appropriately performed, the node resource capability management 222 for extracting and managing information about the capabilities of resources constituting each node, the resource allocation unit 223 for allocating optimal resources based on the information about requested resource allocation and the information about the capabilities of resources, the resource status monitoring unit 225 for monitoring and managing the status of the nodes and the use of the allocated resources, and the resource control unit 224 for providing the independent performance and bandwidth of the allocated resources.

The resource agent unit 221 controls the execution of the functions of the components of all resource agent nodes. The resource agent unit 221 may perform a task requested by the resource manager node 210 of FIG. 2. That is, when being first connect to the resource manager node 210, the resource agent unit 221 may extract node association information and information about the capability of constituent resources via the node resource capability management 222, and send the extracted information to the resource manager node 210 so that the extracted information is registered. The resource agent unit 221 may transfer a request for resource allocation and status monitoring to a relevant block, and send results after the request has been accomplished.

The node resource capability management 222 extracts and stores information about associated resources within a node. That is, the node resource capability management 222 may extract and store resource capability information for each resource configuration, such as FLOPS, IOPS, and bandwidth The resource allocation unit 223 may allocate optimal resources based on the requested resource allocation information, the associated resource information and the resource capability information, and store and manage information about the allocated resource instance.

The resource control unit 224 is responsible for the management and control of resources, such as the isolation between allocated resources and the management of the bandwidth Accordingly, the isolation between allocated resources and the management of the bandwidth are normally performed, so that the performance of an application performed based on resources and the efficiency of use of resources can be guaranteed.

Figure 5:
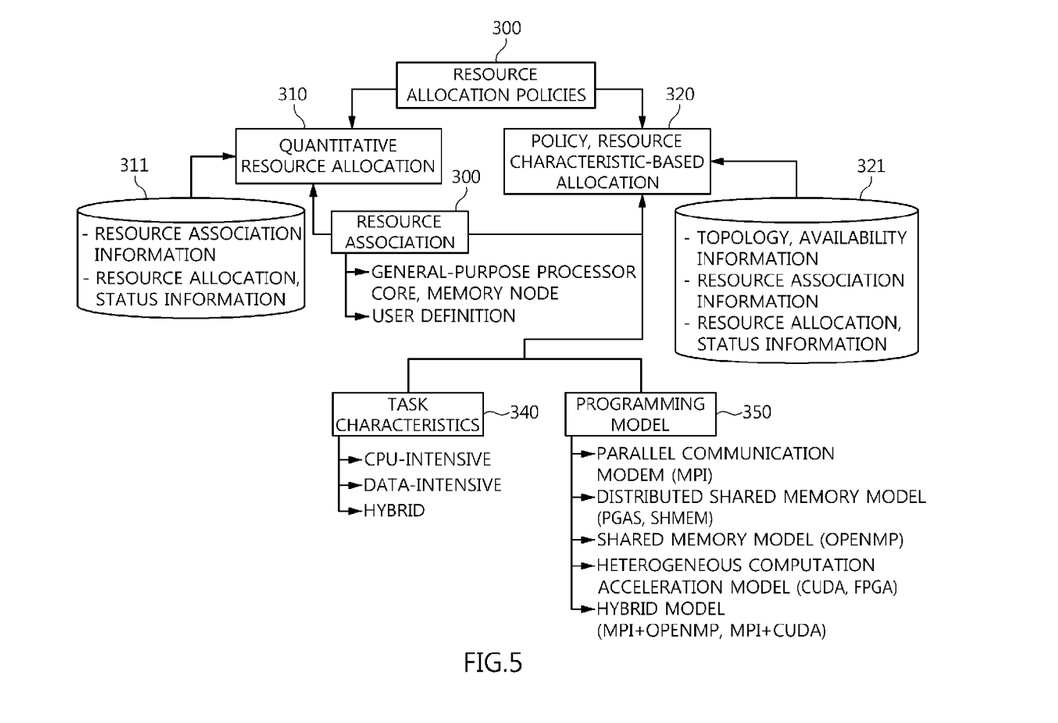
FIG. 5 is a diagram showing the resource allocation policies of the resource manager node according to an embodiment of the present invention.

The resource status monitoring unit 225 may function to monitor information about the use of the allocated resources of each node and information about the status of the node periodically or in response to an event FIG. 5 is a diagram showing the resource allocation policies of the resource manager node according to an embodiment of the present invention.

In accordance with the embodiment, a cluster system whose resources are allocated according to the present invention may be formed of a heterogeneous many-core resource management system.

Resource allocation policies 300 provided by the present invention may include a quantitative resource allocation policy 310 and a policy/resource characteristic-based allocation policy 320.

The quantitative resource allocation policy 310 may include the same allocation scheme as the existing resource management system. That is, nodes and resources may be allocated by utilizing resource allocation and use information 311 in such a way as to use information about resources necessary for execution (i.e., the number of nodes, the number of CPUs, the capacity of memory, and the network bandwidth) as parameters.

In accordance with the embodiment of the present invention, even when quantitative resource allocation is performed, the performance of execution is improved by applying resource association allocation 330. The resource association allocation 330 includes a method of allocating resources together with associated resources within each node. The reason for this is that each of general-purpose processors currently manufactured includes a plurality of sockets and a plurality of pieces of memory. The general-purpose processor will be described in detail later with reference to FIG. 6.

Furthermore, the policy/resource characteristic-based allocation policy 320 may process resource allocation additionally using topology and constituent resource capability information 321 in addition to resource association, resource allocation and status information.

Furthermore, in the resource characteristic-based allocation policy, a programming model 350 is first taken into consideration. The programming model 350 may include a parallel communication model such as an MPI, a distributed shared memory model such as PGAS/SHMEM, a shared memory model such as OpenMP, a heterogeneous computation acceleration model such as CUDA/OpenCL, and a hybrid model. The models have different resource uses and operating characteristics. For example, in the case of the parallel communication model such as an MPI, a large amount of data transmission is performed between a plurality of nodes. Accordingly, the performance of the task to be executed can be optimized only when the resources of a node having the broad network bandwidth and the lowest data communication cost are allocated. As described above, performance and resource efficiency can be improved by allocating optimal resources suitable for the characteristic of each programming model using the topology and capability information.

Task characteristics 340 may include a CPU-intensive task requiring resources having high computing performance, a data-intensive task requiring a lot of data having high capacity or fast data input and output, and a hybrid task having both types of characteristics. In the case of a quantitative resource allocation request in which a task characteristic has not been taken into consideration, it is difficult for a user to precisely determine the performance of constituent resources and request resource allocation. Accordingly, the efficiency of use of resources is low, and it is difficult to optimize the performance of the task to be executed because resources unsuitable for the required resource characteristic of the task are allocated. Furthermore, a resource capability-type resource allocation request for 10 TFLOPS, 10,000 IOPS and a network bandwidth of 100 GB/s cannot be processed in the existing resource management system. Accordingly, in the present invention, the shared resource capability management unit 215 may extract and manage information about the resources of each node, such as FLOPS, IOPS and the network bandwidth, and data, such as network costs in which the topology has been taken into consideration, and the capabilities of resources constituting each node may be extracted and managed FLOPS indicative of computing performance is managed for each constituent core of a CPU and each of the types of computation acceleration devices (a GPU, an MIC, and an FPGA). Accordingly, since fine resource allocation is possible, the efficiency of use of resources can be improved and the task can be performed with optimized performance.

Figure 6:
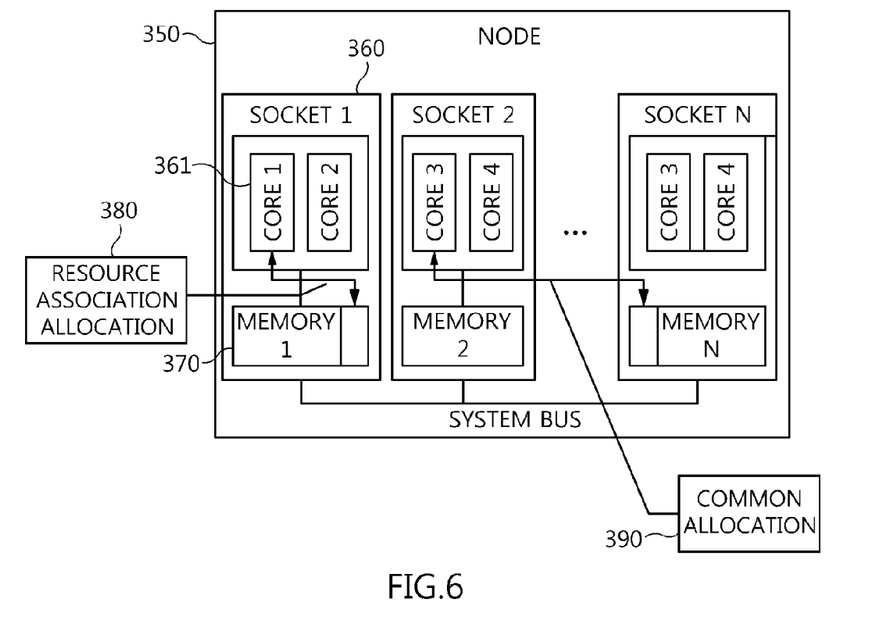
FIG. 6 is a diagram showing the configuration of a general-purpose processor according to an embodiment of the present invention.

FIG. 6 is a diagram showing the configuration of a general-purpose processor according to an embodiment of the present invention.

As shown in FIG. 6, a general-purpose processor 350 recently manufactured includes a plurality of sockets 360. Each of the sockets 360 includes a plurality of cores 361. Furthermore, each of the sockets 360 is connected to a memory node 370, and the sum of the memory capacities of all the memory nodes corresponds to the capacity of system memory. Accordingly, if the memory connected to a socket core is allocated based on resource association allocation 380, the performance of a process or a thread using resources is improved because the locality of data increases. However, if the memory of another socket unconnected to a socket core is allocated based on common allocation 390, the performance of a process or a thread is deteriorated because the memory access cost increases. Accordingly, in the present invention, the performance of all tasks can be improved by guaranteeing resource association allocation as much as possible.

Figure 7:
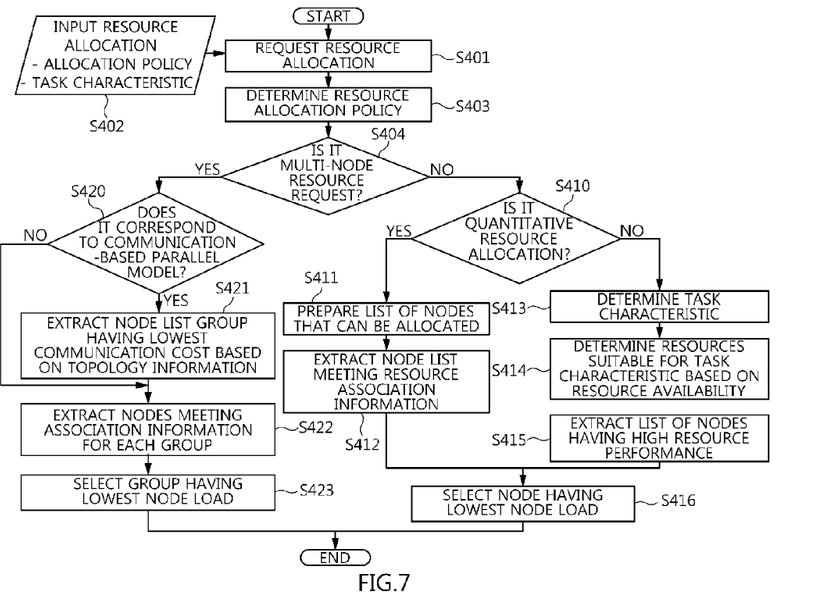
FIG. 7 is a flowchart illustrating a resource management method according to an embodiment of the present invention.

FIG. 7 is a flowchart illustrating a resource management method according to an embodiment of the present invention.

In accordance with the embodiment, the cluster system of the present invention may include a heterogeneous many-core resource management system.

First, the resource management unit 211 of the resource manager node 210 may receive a resource allocation request using the characteristic of a task, a resource allocation policy or the capability of each allocated resource as parameters at step S401.

Thereafter, the resource management unit 211 may determine a resource allocation policy while operating in conjunction with the resource policy management unit 212 based on resource allocation information, such as the allocation policy and the task characteristic, received at step S402, at step S403.

Furthermore, once the resource allocation policy has been determined, it is determined whether the resource allocation request is an allocation request for a single node or for multiple nodes at step S404. If, as a result of the determination at step S404, it is determined that the resource allocation request is an allocation request for a single node, it is determined whether the resource allocation request is a quantitative resource allocation request at step S410.

If, as a result of the determination at step S410, it is determined that the resource allocation request is a quantitative resource allocation request operating in the existing resource allocation system, the shared resource capability management 215 may prepare a list of all nodes each being able to allocate resources at step S411, and extract nodes belonging to all the nodes being able to allocate resources and being able to perform association allocation based on resource association information at step S412.

Accordingly, a node having the lowest node load may be selected from among the extracted nodes based on the resource allocation and use information at step S416. In this way, even in the case of a quantitative resource request related to the existing resource management system, performance can be optimized by allocating a node having high association, and the allocation of resources that increases the rate of use of the entire system and load balancing can be performed by allocating a node having the lowest node load.

In contrast, if, as a result of the determination at step S410, it is determined that the resource allocation request is not a quantitative resource allocation request, the characteristic of a task may be determined at step S413, and resources suitable for the characteristic of the task may be determined based on the characteristic of the task and the required resource performance at step S414. In accordance with the embodiment, in the case of the characteristic of the task, a CPU-intensive task requiring resources having high computing performance (FLOPS), a data-intensive task requiring resources having high capacity memory or I/O performance (IOPS), or a hybrid task requiring both computing performance and I/O performance may be determined. In the case of a quantitative resource allocation request in which the characteristic of a task has not been taken into consideration, it is difficult for a user to precisely determine the performance of constituent resources and request resource allocation. Accordingly, the efficiency of use of resources is low, and it is difficult to optimize performance because resources unsuitable for the required resource characteristic of the task are allocated. For example, a resource capability-type resource allocation request for 10 TFLOPS and 10,000 IOPS and a network bandwidth of 100 GB/s may not be processed in the existing resource management system. Accordingly, in the present invention, the shared resource capability management unit 215 may extract and manage information about the resources of each node, such as FLOPS, IOPS and the network bandwidth, and data, such as network costs in which the topology has been taken into consideration. Furthermore, the resource manager node 210 according to the embodiment of the present invention may extract and manage the capabilities of resources constituting each node. FLOPS indicative of computing performance is managed for each constituent core of a CPU and each of the types of computation acceleration devices (a GPU, an MIC, and an FPGA). Since fine resource allocation is possible, the efficiency of use of resources can be improved and the task can be performed with optimized performance.

Furthermore, when the resources are determined, a list of nodes having high performance for the resources may be extracted at step S415, and a node having the lowest node load may be selected from the list of nodes at step S416.

Furthermore, if, as a result of the determination at step S404, it is determined that the resource allocation request is a resource allocation request for multiple nodes, it is determined whether the resource allocation request is a communication-based parallel programming model at step S420. In accordance with the embodiment, if the programming model is a communication-based parallel model, such as an MPI, a node group having the lowest communication cost should be allocated based on the topology and the network costs. That is, nodes connected to the same network switch should be selected, and a node connected to another rack or switch may have low performance because delay time increases even when it has the same bandwidth Accordingly, a list of node groups having the lowest communication cost is extracted at step S421. Thereafter, the resource association information of each of nodes included in the list of the extracted groups is checked at step S422. A group including nodes having high resource association may be selected, or if multiple groups having the same resource association are present, a group having the smallest sum of node loads may be selected based on information about the use and status of nodes at step S423.

Furthermore, if, as a result of the determination at step S420, it is determined that the resource allocation request is a communication-based parallel programming model, the step of extracting a list of node groups having the lowest communication cost using the topology and the network costs may not be performed. Accordingly, node groups meeting resource association information as much as possible may be selected at step S422, and a group having the lowest node load may be finally selected at step S423, thereby being capable of completing the selection of resource allocation nodes and the resources of the nodes.

Accordingly, the performance of an application performed in an HPC cluster system including heterogeneous high-capability resources may be optimized and the efficiency of resources may be improved using the quantitative resource allocation and management method provided by a conventional resource management system and the policy and resource characteristic-based resource allocation method provided by the present invention.

In accordance with the present invention, a variety of types of heterogeneous resources having heterogeneous characteristics may be effectively managed and the complexity of a use environment is minimized Accordingly, the optimization of the performance of the cluster system and the convenience of the utilization of HPC can be expanded.

Furthermore, the communication costs between nodes can be minimized based on an application model by allocating resources based on a policy while taking into consideration the application model and resource characteristics, the performance of execution can be improved by allocating resources based on the association between resources within each node, and the efficiency of use of resources and the performance of resources can be optimized by allocating resources while taking into consideration data and computing-intensive task characteristics.

Moreover, there are advantages in that the performance of application software performed in an HPC environment can be improved and the operating cost of a cluster system can be reduced by increasing the efficiency of use of resources.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A resource manager node, comprising:
 a resource management unit for performing an operation necessary for resource allocation when a resource allocation request for performance of a specific task on a cluster system including heterogeneous resources is received;
 a resource policy management unit for managing a resource characteristic-based resource allocation policy and a quantitative resource allocation policy, determining a resource allocation policy being the resource characteristic-based resource allocation policy or the quantitative resource allocation policy based on a characteristic of the task, and generating resource allocation information including information about one or more allocated node and resources based on the determined resource allocation policy;
 a shared resource capability management unit for managing each topology of a plurality of nodes connected to the resource manager node, information about capabilities of resources of each of the nodes, and resource association information of each of the nodes;
 a shared resource status monitoring unit for monitoring and managing information about status of each of the plurality of nodes and information about use of allocated resources; and a shared resource allocation unit for sending a resource allocation request according to the resource allocation information to at least one of the plurality of the nodes based on the resource allocation information, the topology information, and the resource capability information, wherein the resource policy management unit, if the resource allocation request is a multi-node request and the resource manager node corresponds to a communication-based parallel model comprising a Message Passing Interface (MPI) to determine communication costs between nodes that can be allocated to a parallel program in the cluster system, generates a first node list including nodes having a least communication cost based on the topology information of the shared resource capability management unit, generates a second node list including nodes belonging to the nodes included in the first node list and meeting a resource association condition by referring to the resource association information of the shared resource capability management unit, and generates the resource allocation information so that resources are provided by a node group having lowest node load within the second node list by referring to the monitoring information, wherein the resource policy management unit, if the resource allocation request is a multi-node request and the resource manager node does not correspond to the communication-based parallel model, generates a third node list including nodes meeting a resource association condition by referring to the resource association information of the shared resource capability management unit, and generates the resource allocation information so that resources are provided by a node group having lowest node load within the third node list by referring to the monitoring information, wherein the resource policy management unit, if the resource allocation request is a single node request and the determined resource allocation policy is not the quantitative resource allocation policy, determines the characteristic of the task, generates a fourth node list including nodes having resources matching the determined characteristic based on the resource capability information of the shared resource capability management unit, and generates the resource allocation information so that resources are provided by a node having lowest node load within the fourth node list by referring to the monitoring information, and wherein the resource policy management unit, if the resource allocation request is a single node request and the determined resource allocation policy corresponds to the quantitative resource allocation policy, generates a fifth node list including nodes belonging to all nodes connected to the resource manager node and being able to allocate resources in response to the resource allocation request using the shared resource capability management unit, generates a sixth node list including nodes belonging to the nodes included in the fifth node list and meeting a resource association condition by referring to the resource association information of the shared resource capability management unit, and generates the resource allocation information so that resources are provided by a node having lowest node load within the sixth node list by referring to the monitoring information.

2. The resource manager node as set forth in claim 1, wherein the resource policy management unit sets any one of a characteristic requiring high-speed data input and output, a characteristic requiring high computation speed, and a characteristic requiring complex performance for the task.

3. The resource manager node as set forth in claim 1, wherein the shared resource capability management unit, when the resource manager node is connected to a resource provision unit of a specific node, receives information about the specific node from the resource provision unit and stores and manages the received information.

4. The resource manager node as set forth in claim 1, wherein the shared resource allocation unit, when resources corresponding to the resource allocation request are allocated, generates a resource allocation instance and stores information about the at least one node and resources allocated by a resource provision unit in the resource allocation instance.

5. The resource manager node as set forth in claim 1, wherein the shared resource capability management stores and manages information about capability of each resource configuration, including information about at least one of a topology, a network distance, associated resources, computation performance, data input/output performance and a bandwidth of each of the nodes included in the cluster system.

6. A resource allocation method for a resource manager node of a cluster system comprising a plurality of nodes with heterogeneous resources, comprising:

managing a resource characteristic-based resource allocation policy and a quantitative resource allocation policy;

determining a resource allocation policy being the resource characteristic-based resource allocation policy or the quantitative resource allocation policy based on a characteristic of a specific task, when a request for resource allocation to perform the specific task is received;

determining one or more nodes of the plurality of nodes whose resources will be allocated based on the determined resource allocation policy, a topology information of nodes included in the cluster system, information about capabilities of resources constituting each of the nodes, and resource association information of each of the nodes;

determining whether the request is a multi-node request or a single node request;

generating a first node list including nodes having lowest communication cost based on the topology information of the nodes, if the request for resource allocation is the multi-node request and the resource manager node corresponds to a communication-based parallel model comprising a Message Passing Interface (MPI) to determine communication costs between nodes that can be allocated to a parallel program in the cluster system;

generating a second node list including nodes belonging to the nodes included in the first node list and meeting a resource association condition based on the resource association information of each of the nodes;

generating resource allocation information by referring to information about status of each of the one or more nodes and use of allocated resources so that resources are provided by a node group having lowest node load in the second node list; and requesting resource allocation by sending the generated resource allocation information to the determined one or more nodes, if the request for resource allocation is the multi-node request and the resource manager node does not correspond to the communication-based parallel model, generating a third node list including nodes meeting the resource association condition after taking into consideration the resource association information; and selecting a node group having lowest node load from the third node list while referring to monitoring information, if the request for resource allocation is the single node request and the determined resource allocation policy does not correspond to the quantitative resource allocation policy, determining a characteristic of the specific task and generating a fourth node list including nodes having resources matching the determined characteristic based on the resource capability information; and generating the resource allocation information so that the resources are provided by a node having lowest node load within the fourth node list by referring to the monitoring information, and if the request for resource allocation is the single node request and the determined resource allocation policy is the quantitative resource allocation policy, generating a fifth node list including nodes belonging to all nodes connected to the resource manager node and being able to allocate resources in response to the resource allocation request;

generating a sixth node list including nodes belonging to the nodes included in the fifth node list and meeting the resource association condition while taking into consideration the resource association information; and generating the resource allocation information so that the resources are provided by a node having lowest node load within the sixth node list by referring to monitoring information.

7. The resource allocation method as set forth in claim 6, wherein the determining the resource allocation policy comprises setting any one of a characteristic requiring high-speed data input and output, a characteristic requiring a high computation speed, and a characteristic requiring complex performance for the task.

8. The resource allocation method as set forth in claim 6, wherein the determining the node whose resources will be allocated comprises, receiving information about the specific node from a resource provision unit of the specific node, when the resource manager node is connected to the resource provision unit.

9. The resource allocation method as set forth in claim 6, further comprising:
   generating a resource allocation instance, when resources corresponding to the resource allocation request are allocated; and
   storing information about the determined node and resources allocated by a resource provision unit in the resource allocation instance.

10. The resource allocation method as set forth in claim 6, wherein the determining the node whose resources will be allocated comprises loading capability information about each resource configuration, including information about at least one of a topology, a network distance, associated resources, computation performance, data input/output performance, and a bandwidth of each of the nodes included in the cluster system.

* * * * *